United States Patent [19]
Tilbury

[11] 3,814,191
[45] June 4, 1974

[54] POWERED LIFT AND LOCK FOR A FOLDABLE IMPLEMENT FRAME

[75] Inventor: Lawrence E. Tilbury, Moline, Ill.

[73] Assignee: J. I. Case Company, Racine, Wis.

[22] Filed: Dec. 26, 1972

[21] Appl. No.: 318,387

[52] U.S. Cl.................. 172/311, 172/481, 172/583
[51] Int. Cl...................... A01b 63/00, A01b 35/16
[58] Field of Search............ 172/311, 315, 454–456, 172/481, 580, 583, 666

[56] References Cited
UNITED STATES PATENTS

| | | | |
|---|---|---|---|
| 2,972,385 | 2/1961 | Walberg......................... | 172/456 X |
| 3,274,713 | 9/1966 | Jones.............................. | 172/481 X |
| 3,633,680 | 1/1972 | Womble et al. .................... | 172/456 |
| 3,650,333 | 3/1972 | Fueslein............................. | 172/311 |
| 3,692,121 | 9/1972 | Kenney............................. | 172/456 |
| 3,693,724 | 9/1972 | Fueslein et al...................... | 172/456 |
| 3,713,495 | 1/1973 | Redford............................ | 172/456 |

Primary Examiner—Robert E. Pulfrey
Assistant Examiner—Paul T. Sewell
Attorney, Agent, or Firm—Arthur J. Hansmann

[57] ABSTRACT

A powered lift and lock for a foldable implement frame having a main frame and a wing frame pivotally mounted on the main frame for folding relative thereto. Disc harrows are suspended on the frames for working the ground in the usual manner. A latch is pivotally mounted on the wing frame and cam-locks with the main frame to hold the two frames in the horizontal position. A hydraulic cylinder is mounted on the main frame and its rod extends to the wing frame and connects therewith for lifting and lowering the wing frame. The connection between the rod and the wing frame is a lost motion connection, and a link extends between the connection of the rod and the latch so that the latch is secured when the wing frame is lowered, and the latch is released in the initial motion of raising the wing frame. Two species are shown, one where the hydraulic cylinder rod connects directly with the wing frame, and the other where the hydraulic cylinder rod connects with the wing frame through a linkage. The wing frame has a support surface which engages a pad on the main frame for supporting the wing frame in folded position on top of the main frame.

5 Claims, 3 Drawing Figures

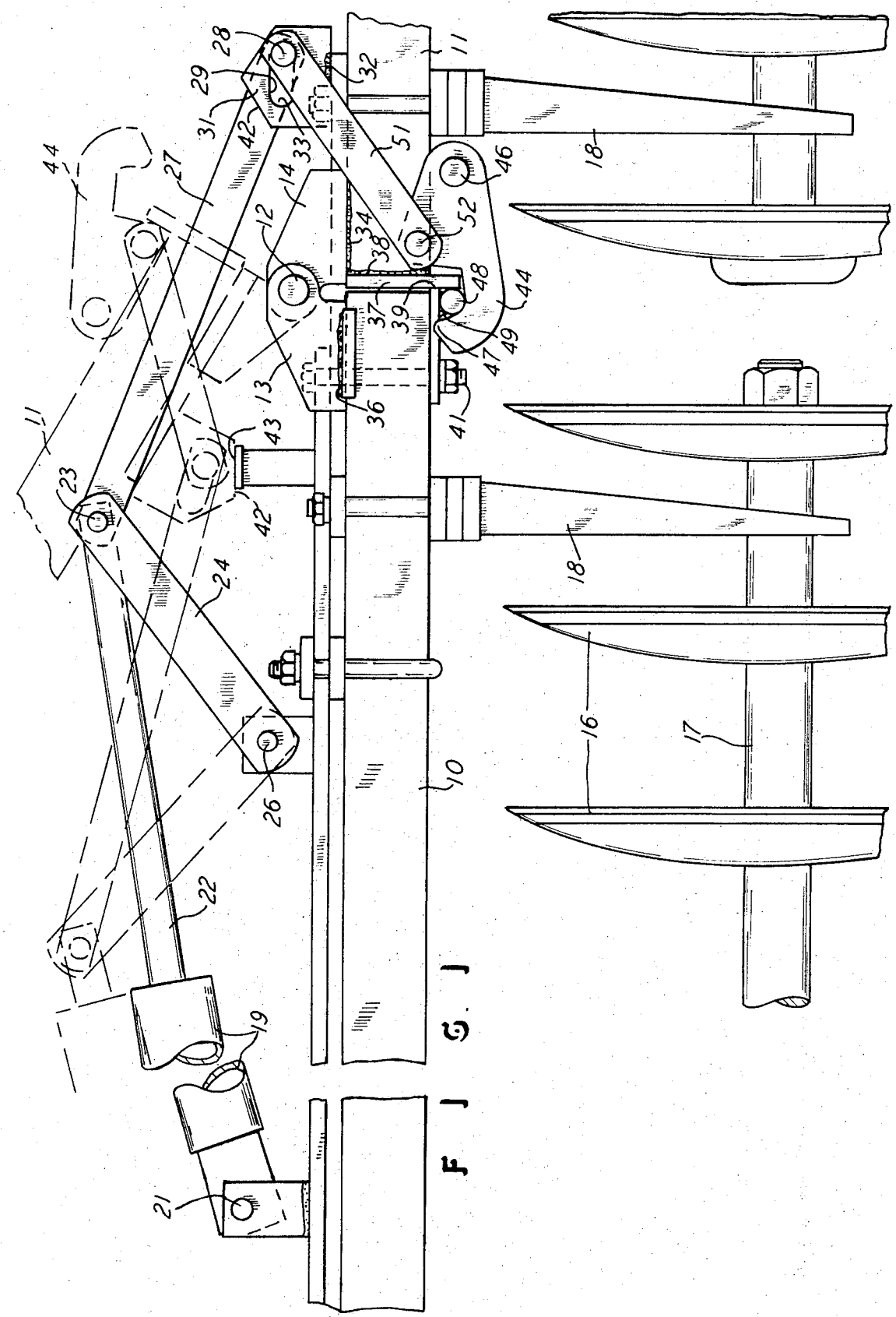

3,814,191

POWERED LIFT AND LOCK FOR A FOLDABLE IMPLEMENT FRAME

This invention relates to a powered lift and lock for a foldable implement frame, and, more particularly, it relates to that mechanism as applied to agricultural implements, such as a disc harrow having a wing frame pivotally mounted on a main frame and with a powered cylinder connected between the frames for the pivotal raising and lowering of the wing frame.

BACKGROUND OF THE INVENTION

The prior art is already aware of agricultural implement frames where wing frames are pivotally mounted on main frames. The wing frames commonly extend laterally of the main frame, and they are pivoted upwardly in a folded position, relative to the main frame, for presenting a narrower width of the overall unit, for transport or like reasons. Further, the prior art is aware of the employment of powered cylinders, such as hydraulic cylinders, which are utilized for raising and lowering the wing frame, and there is also common use of latch mechanisms which hold the two frames in the rigid or non-pivotal condition, and such latches can be released when the powered cylinder is actuated for raising the wing frame. One common example of a prior art unit is shown in U.S. Pat. No. 3,650,333, and another example is shown in U.S. Pat. No. 3,633,680.

The present invention is therefore concerned with agricultural implement frames which have pivotally mounted wing frames which are under the influence of a powered cylinder and which have a latch for securing the wing frame in the non-pivoted position so that the powered cylinder need not hold the wing frame in its non-pivotal position. Accordingly, it is the object of this invention to provide a unit which presents the structure and accomplishes the objectives mentioned, and to do so with a sturdy and efficiently operating unit and one which is not complex nor expensive.

A more specific object of this invention is to provide an implement frame of the type mentioned and which achieves maximum control of the wing frame by providing adequate leverage in pivoting the frame and by providing a secure position for the wing frame in the folded position. In accomplishing this object, a powered cylinder is utilized but it is not required to exert a maximum force at the over-center point of swinging the wing frame, nor is it required to exert any force for holding the wing frame in the unfolded or extended position. Still further, the wing frame is retained in the extended position without any critical or close tolerances for the hydraulic cylinder and its connecting linkage relative to the wing frame, and a latch holds the wing frame in the extended position without requiring that the powered cylinder be placed in a certain or accurate position.

Another object of this invention is to provide a foldable implement frame of the type mentioned and to do so with a mechanism which is simplified but yet sturdy, compared to the prior art, and which readily and securely positions the wing frame in the unfolded position, holds the wing frame in that position without any force in the powered cylinders or any other parts, except for a latch, and which securely positions the wing frame in the folded position by resting it upon the main frame without any of the weight of the wing frame being on the powered cylinder utilized for folding and unfolding the wing frame.

Other objects and advantages will become apparent upon reading the following description in light of the accompanying drawings.

BRIEF DESCRIPTION OF THE DRAWINGS

FIG. 1 is a front elevational view of a fragment of an implement frame having a preferred embodiment of this invention.

DETAILED DESCRIPTION OF THE PREFERRED EMBODIMENTS

Figure 3:
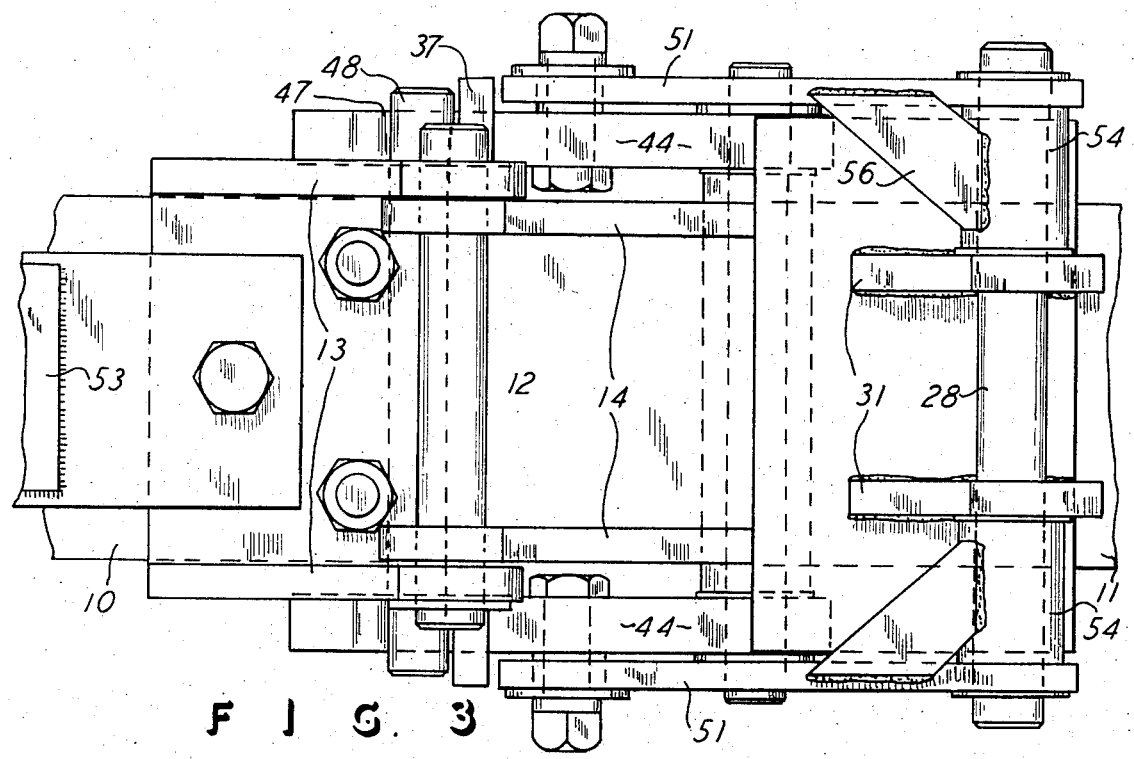
FIG. 3 is a top plan view of the fragment shown in FIG. 2.

FIG. 1 shows one embodiment of the invention having a main frame 10 and a wing frame 11 which is pivotally connected to the main frame through a pivot pin 12 supported by brackets 13 and 14 on the respective frames. FIG. 1 shows the fragment of the implement frame with the sections 10 and 11 and with the wing frame 11 being in the horizontal or unfolded position, in solid lines, and it shows the wing frame 11 in the raised or folded position, in the dot-dash lines. The implement frame can be the disc harrow type of frame having the usual discs 16 rotatably suspended under the frame by means of the usual axle 17 and the suspension support 18. Thus, in the well-known manner, a disc harrow is provided, and it will be understood that the general arrangement of the pivoted frame section and the discs and the like are conventional and will therefore be understood by one skilled in the art. A hydraulic cylinder 19 serves as a powered means and is pivotally mounted on the main frame 10 by means of the pivot pin 21, and a cylinder rod 22 extends to a pin 23 which pivotally connects to an arm 24 pivoted on the main frame by means of a pin 26. Another link or arm 27 is also pivotally connected to the pin 23 and extends therefrom to a pin 28 which is slidably received in a horizontally disposed slot 29 in an upstanding bracket 31 fixedly secured to the wing frame 11, such as by welding shown at 32.

Thus, the powered means 19 is connected to the wing frame 11 through the lost motion connection described such that when the rod 22 is retracted into the cylinder designated 19, the pin 28 is retracted in the horizontal slot 29 so that it moves to the end 33 of the slot 29, and at that point the powered means 19 through the link 27 and pin 28 pull on the bracket 31 to ultimately raise the wing section 11 to its dot-dash position shown. In that pivoting action, the bracket 14, which is fixedly connected to the wing section 11 through welding at 34, pivots relative to the bracket 13, which is fixedly connected to the main frame 10 through welding at 36.

Also, in the unfolded position of the wing frame 11, as seen in full lines in FIG. 1, a plate 37 which is affixed to the wing frame 11 by welding at 38, abuts the edge of a plate 39 which is affixed to the main frame 10 by means of the bolt 41, as shown. In that arrangement, the wing frame 11 can pivot downwardly to the full-line position of FIG. 1 and have the wing frame 11 in extended alignment with the main frame 10, as shown. Also, in the folded position of the wing frame 11, the bracket 31 has an oblique surface 42 which becomes disposed on a horizontal plane in the folded position of the wing frame 11, and the surface 42 then rests on a horizontal surface 43 which is a pad for abutting the main frame 10 and being fully supported thereon without involving any force or support from the linkage or from the powered means 19.

To secure the wing frame 11 in the unfolded position, a lock, in the form of a latch 44 is pivotally mounted on the wing frame on a pin 46 which is suitably secured to the wing frame 11. The latch 44 has a finger end 47 which has an exterior curved surface and which engages a pin 48 affixed to the main frame 10 by means of welding at 49. With this arrangement, the latch 44 can pivot into and out of securing engagement with the pin 48 for holding the wing frame in the extended and non-pivotal position shown by solid lines in FIG. 1. In securing the latch 44 with the latch pin 48, the pin 48 is cylindrical and the finger 47 is curved as shown, and there is thus a cam lock or camming action when the latch 44 is pivoted upwardly to engage the pin 48.

To release the latch 44 from the solid-line position shown in FIG. 1, a connector, in the form of a link 51, is pivotly connected to the latch 44 through a pin 52, and the connector 51 is also connected to the pin 28 and, as such, it is indirectly connected with the powered means 19.

In operation, when the rod 22 is withdrawn for raising the wing frame 11, the pin 28 is slid in the slot 29 to the end 33, and the link 51 is therefore moved downwardly to pivot the latch 44 away from the latch pin 48 and thereby release the wing frame 11. Further retraction of the rod 22 will cause the pin 28 to pull on the bracket 31 at the slot end 33 and thus pivot the wing frame 11 upwardly. As the wing frame 11 moves upwardly, the leverage effective for the powered means 19 is increased and thus the wing frame 11 can be adequately controlled when it is in its maximum raised or vertical position, and thus the wing frame will not uncontrollably fall from this on-center or vertical position, and the wing frame can be accurately lowered onto its resting position on the pad 43. Conversely, when the wing frame 11 is lowered, it is again under complete control of the powered cylinder 11, and, actually, in the final positions of lowering, the pin 28 is in the slot end 33. Then when the pin 28 is moved to the end of the slot 29 in which it is shown in FIG. 1, the link 51 is raised to pivot the latch 44 into its securing position as shown. However, the powered means 19 is not holding the wing frame at that unfolded position.

Figure 2:
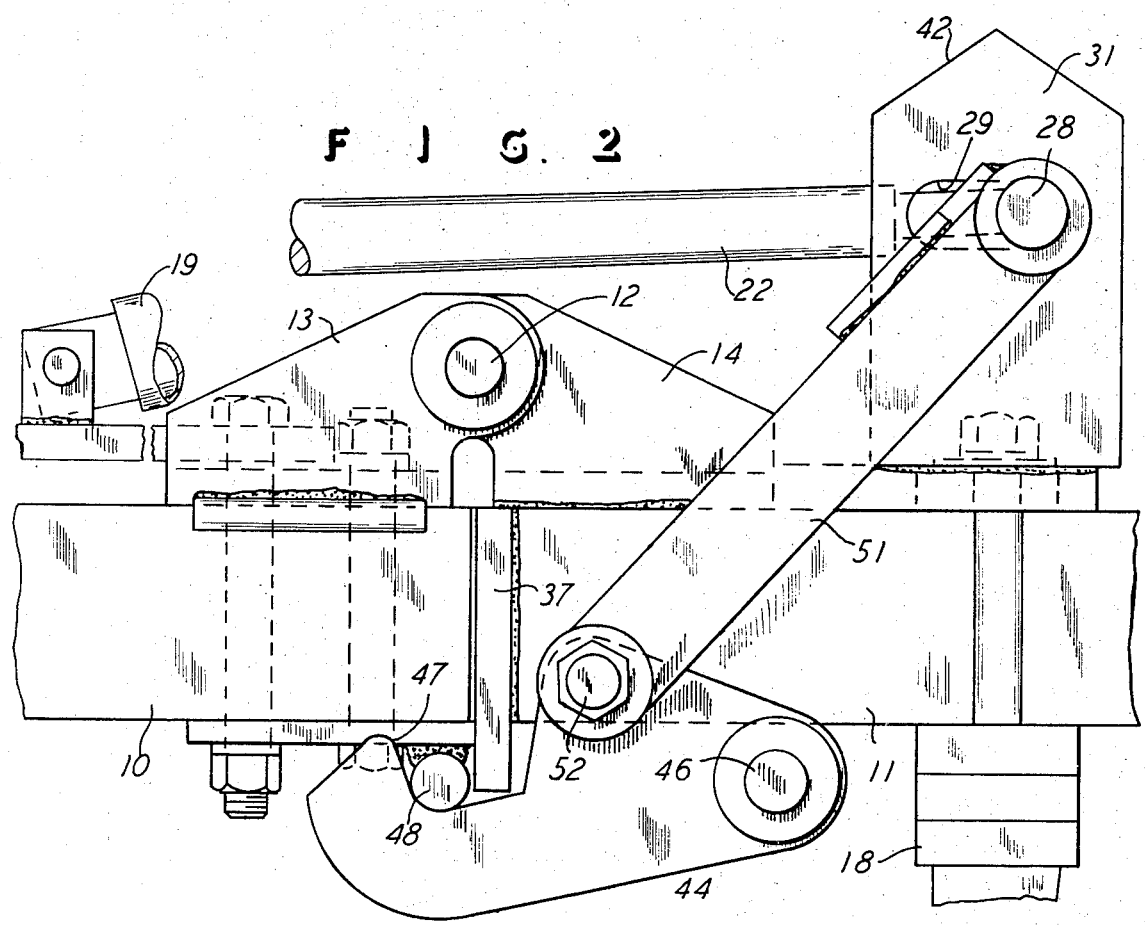
FIG. 2 is a view of a fragment of an implement frame similar to FIG. 1, but having a somewhat different embodiment of this invention applying thereto.

FIGS. 2 and 3 show another embodiment of the invention which essentially eliminated the links 24 and 27 and has the hydraulic ram 22 connected directly to the pin 28. Also, FIG. 3 shows that many of the parts described in connection with FIG. 1 are in pairs, and this showing of FIG. 3 is therefore accurate for FIG. 1 as well as FIG. 2, and it will be understood as such.

FIGS. 2 and 3 therefore show generally the same main frame 10 and wing frame 11 and the pivot pin 12 therebetween. It will of course be understood that the wing frame 11 pivots upwardly on the main frame 10, but, in this instance, the surface 42 on the wing frame bracket 31 rests on the pad or surface 53 affixed to the top of the main frame 10, as seen in FIG. 3. That is, there is no elevated or upstanding portion on the main frame 10 presenting the pad surface 43, but instead the pad 53 is down on the main frame 10 since the wing frame 11 can fold compactly with the main frame 10, relative to the folding shown in FIG. 1. FIGS. 2 and 3 therefore show the single rod 22 attached with the pin 28 which is supported by the two spaced-apart brackets 31 affixed on the wing frame 11. Also, the wing frame 11 has two spaced-apart brackets 14, and the main frame 10 has two spaced-apart brackets 13, as seen in FIG. 3. Likewise, FIG. 3 shows two links 51 and two latches 44, these parts being in pairs and with one on each side of the frame unit. In the same manner, FIG. 1 would have pairs of the parts as shown and described in connection with FIG. 3. FIG. 3 further shows that there are two sleeves 54 which are rotatable relative to the pin 28 on which they are mounted, and corner brackets 56 are affixed to the sleeves and to the links 51, such as by the welding shown. Therefore, the links 51, and consequently the latches 44, can act somewhat independent of each other and need not be accurately aligned relative to each other but both will reliably and securely operate in response to the movement of the links 51.

What is claimed is:

1. A powered lift and lock for a foldable implement frame comprising a main frame section, a wing frame section, a pivot mounting for pivotally attaching said wing frame section to said main frame section to have said wing frame section pivotal on said main frame section between a position forming an extension to said main frame section and a position of being foldable over said main frame section, a lock releasably interconnected between said sections for releasably securing said wing frame section in the extended disposition relative to said main frame section, said lock including a latch pivotally mounted on said wing frame section on a pivot axis located at an elevation lower than the elevation of said pivot mounting and having a curved finger on the extending end of said latch, a latch curved surface on said main frame section and disposed for engagement by said curved finger for latching said latch to said curved latch surface, said latch being pivotally mounted on said wing frame section to be pivotal in an upward direction on said wing frame section when pivoting into engagement with said curved latch surface, powered means mounted on said main frame section and being connected with said wing frame section in a lost motion connection engaged in one direction of movement of said connection for pivotally lowering said wing frame section relative to said main frame section and said lost motion connection engaged in the other direction of movement of said connection for raising said wing framed section relative to said main frame section, and a connector pivotally connected between said latch and said lost motion connection and arranged to pivot said latch into the latching position upon movement of said connection in said one direction and to pivot said latch into the unlatched position upon movement of said connection in said other direction.

2. The powered lift and lock for a foldable implement frame as claimed in claim 1, wherein said lost motion connection is a slot in said wing frame section and is horizontally disposed when said wing frame section is in the position forming an extension to said main frame section, and the contact between said powered means and said wing frame section being established at each end of said slot and with said lost motion connection being disposed to be pivotal about said pivot mounting of the attachment between said frames, for maximum leverage between said pivot mounting and said lost motion connection when said wing frame section is in the folded over position.

3. The powered lift and lock for a foldable implement frame as claimed in claim 2, wherein said connector is a link having one end connected with said powered means and the other end pivotally connected with said latch.

4. The powered lift and lock for a foldable implement frame as claimed in claim 1, wherein said connector is a link pivotally connected to said latch at a location spaced from the pivot axis of said latch, for forming an articulated linkage with said latch and said connector, and said powered means being a cylinder and rod assembly with the cylinder pivotally mounted on said main frame section.

5. The powered lift and lock for a foldable implement frame as claimed in claim 1, including linkage interconnected between said powered means and said wing frame section, with one link of said linkage being pivoted on said main frame section.

* * * * *